June 18, 1929.  A. ALDRICH  1,717,359
BELT TIGHTENING DEVICE
Original Filed Jan. 8, 1923
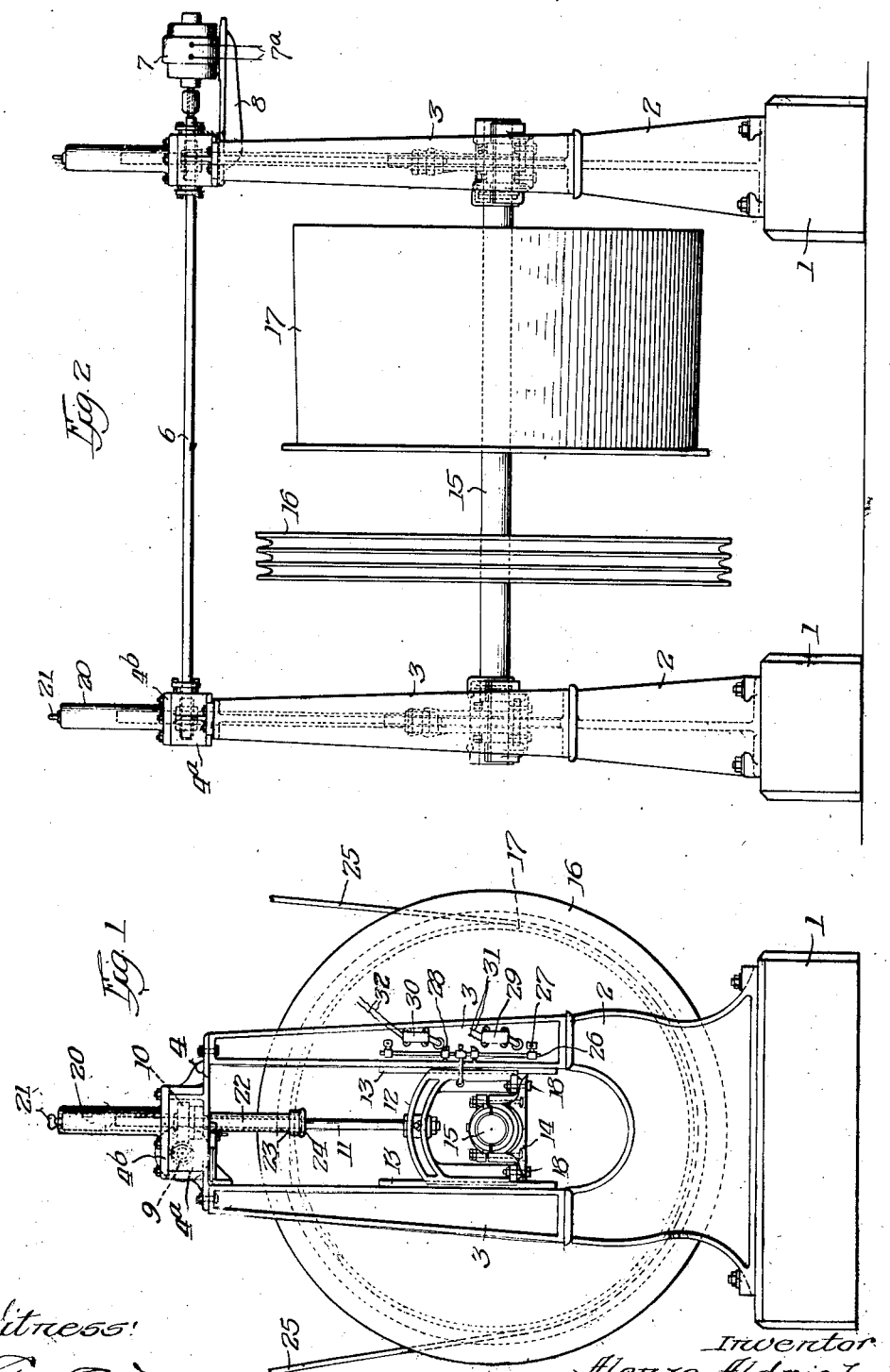

Patented June 18, 1929.

1,717,359

UNITED STATES PATENT OFFICE.

ALONZO ALDRICH, OF BELOIT, WISCONSIN.

BELT-TIGHTENING DEVICE.

Application filed January 8, 1923, Serial No. 611,244. Renewed September 26, 1928.

My invention relates to belt tightening devices, and particularly to such as are used in paper making machinery for tightening driving belts therein, and also for engaging and disengaging such belts by vertical adjustment of the driving pulleys, thereby avoiding the need of clutches and the like.

The object of the invention is to produce a simple, practical and advantageous mechanism of this kind.

A further object of the invention is to secure simplicity of construction and reliability and efficiency in operation.

In the accompanying drawings, Fig. 1 is an end elevation of a device of the class specified embodying my present invention;

Fig. 2 is a front elevation of the same.

Referring to the drawings, two supporting or pedestal members 1—1 support uprights or standards 2—2, which in turn support pillars 3—3 on the tops of which are mounted and bolted cross-plates 4—4. Bearing blocks 4ª—4ª for a cross-shaft 6 are mounted on and preferably made integral with plates 4, plates 4ᵇ—4ᵇ being bolted to blocks 4ª—4ª. An electric motor 7 is connected with end of shaft 6, and mounted on bracket 8. Wires 7ª run from motor 7 upstairs to controlling switch or push button.

The rotary shaft 6 has worm and wheel connections 9 and 10, with threaded rods 11—11 which extend down and are connected to yokes or carriages 12—12 which are arranged to slide between guide-ways 13—13, on uprights 3—3. Yokes or carriages 12—12 carry bearings 14—14 for a pulley shaft 15, which carries the rope wheel 16 and pulley 17. The bearings 14 are mounted removably in lower ends of yokes 12, being secured thereto by bolts 18. This permits bearings 14 to be taken out and replaced as desired.

For automatically stopping carriages 12—12 at upper and lower ends of travel, I show a trip device comprising rods 26 carried by one of the carriages 12 and having abutments 27, 28 and trip devices 29 and 30, cooperating therewith. Electrical connections 31 and 32 run from trips 29 and 30 to motor 7 so that said motor will be automatically stopped by one trip or the other, and so limit the up or down movement of pulley shaft 15. Thus if workman upstairs inadvertently leaves switch on too long, the up or down movement of the shaft 15 will be automatically stopped and no damage done. Oil cylinders 20—20 are provided for upper threaded ends of rods 11—11, said cylinders being filled with oil and provided with thumb nuts 21—21. Other oil cylinders 22—22 extend down from plates 4—4 for said rods 11—11, and are provided with packing nuts 23, 24. Cylinders 20 are preferably made integral with plates 4ᵇ and cylinders 22—22 preferably made integral with plates 4—4. A belt 25 running over pulley 17 and up to paper making machinery is shown.

Thus adjustment of shaft 15 with wheel 16 and pulley 17 may be secured by operating motor 7, and this adjustment will tighten belt 25 as desired and will also permit said belt to be engaged and disengaged. Thus the device may really be used as a clutch to connect and disconnect paper or other machinery driven by belt 25 with rope drive running over wheel 16 or other driving device.

It will be understood that changes and modifications may be made without departing from the spirit of the invention.

What I claim is:

1. A device of the class specified comprising a frame having vertical guideways, vertically adjustable members arranged in said guideways, said members being provided with bearings, a driving shaft carried by said bearings, vertical rods having their lower ends connected with said members, a cross shaft extending between said vertical rods, worm and wheel connections between the cross shafts and said rods and an electric motor connected with the end of said cross shaft, said rods being provided with oil cylinders above and below the connections with said cross shaft.

2. A device of the class specified comprising a pulley shaft provided with bearings, longitudinally adjustable rods connected to said bearings permitting the lateral adjustment of the shaft, mechanism for adjusting said rods, and power means for actuating said mechanism in combination with means for automatically controlling said power means to stop said power means at either end of a predetermined path of travel.

3. A device of the class specified comprising a belt tightening device, an electric motor for operating said device, and means for automatically opening the circuit of said electric motor when the device is operated to a predetermined position.

4. A device of the class specified comprising a belt tightening device, an electric motor for operating said device, and means for automatically opening the circuit of said electric motor at the opposite ends of a predetermined path of travel.

5. The combination with a pulley for the end of a belt, means for mounting the pulley so as to permit its adjustment to tighten and loosen the belt, mechanism for actuating said mounting means, an electric motor for operating said mechanism, and electrical contact devices for opening and closing the motor circuit when the pulley is adjusted to a predetermined position.

6. The combination of a pulley shaft carrying a pulley, bearings for the pulley shaft mounted for adjustment to permit lateral adjustment of said shaft, longitudinally adjustable rods carrying said bearings, worm and wheel mechanism for longitudinally adjusting said rods, the worms of said mechanism being carried by a transverse shaft operating both longitudinally adjustable rods, and an electric motor operating said transverse shaft.

7. The combination of a pulley shaft carrying a pulley, bearings for the pulley shaft mounted for adjustment to permit lateral adjustment of said shaft, longitudinally adjustable rods carrying said bearings, worm and wheel mechanism for longitudinally adjusting said rods, the worms of said mechanism being carried by a transverse shaft operating both longitudinally adjustable rods, an electric motor operating said transverse shaft, and contact devices one of which is carried by one of the adjustable bearings so as to control the motor circuit.

In witness whereof, I hereunto subscribe my name this 22nd day of December, A. D., 1922.

ALONZO ALDRICH.